United States Patent
Yaari et al.

(10) Patent No.: US 12,081,539 B1
(45) Date of Patent: Sep. 3, 2024

(54) AUTOMATED SECURE ACCESS TO ONLINE ACCOUNTS

(71) Applicant: Grip Security Ltd, Tel Aviv (IL)

(72) Inventors: Lior Chaim Yaari, Boston, MA (US); Idan Pinchas Fast, Tel Aviv (IL); Alon Shenkler, Tel Aviv (IL)

(73) Assignee: Grip Security Ltd, Tel Aviv (IL)

( * ) Notice: Subject to any disclaimer, the term of this patent is extended or adjusted under 35 U.S.C. 154(b) by 0 days.

(21) Appl. No.: 18/534,650

(22) Filed: Dec. 10, 2023

(51) Int. Cl.
*H04L 9/40* (2022.01)
*G06F 21/00* (2013.01)
*G06F 21/45* (2013.01)

(52) U.S. Cl.
CPC .......... *H04L 63/0846* (2013.01); *G06F 21/45* (2013.01)

(58) Field of Classification Search
CPC .......... G06F 21/45; G06F 21/30; G06F 21/31; G06F 21/34; G06F 21/41; G06F 21/42; G06F 21/44; G06F 21/46; H04L 63/0846
See application file for complete search history.

(56) References Cited

U.S. PATENT DOCUMENTS

| 2010/0325707 | A1* | 12/2010 | Iverson | H04L 63/1433 |
| | | | | 726/6 |
| 2014/0189808 | A1* | 7/2014 | Mahaffey | G06F 21/6245 |
| | | | | 726/4 |
| 2017/0011214 | A1* | 1/2017 | Cavanagh | H04L 63/0846 |

* cited by examiner

*Primary Examiner* — Edward Zee

(57) ABSTRACT

A method of increasing security of access to online accounts, comprising resetting access credentials of one or more accounts of one or more online services of one or more users, by transmitting an access credentials reset request, intercepting one or more credentials reset messages transmitted via one or more correspondence channels associated with the one or more users, the one or more credentials reset messages comprise a credentials reset network address, and accessing the credentials reset network address to replace existing access credentials for the one or more accounts with increased security credentials. Wherein one or more automated access agents adapted to automatically login the one or more users into the one or more online services uses the increased security credentials to login to the one or more accounts.

18 Claims, 4 Drawing Sheets

AUTOMATED SECURE ACCESS TO ONLINE ACCOUNTS

FIELD AND BACKGROUND OF THE INVENTION

The present invention, in some embodiments thereof, relates to increasing security of access to online accounts and, more specifically, but not exclusively, to increasing security of access to online accounts by automatically resetting login access credentials for the online accounts and replacing them with increased security credentials.

Online services encompass a wide array of platforms and tools accessible through the internet, serving various purposes such as communication, work related applicators, productivity, entertainment, and more.

These services typically require users to create online accounts and log-in in order to access their features and content securely. Users typically need to first create an account at the online services by providing personal information like name, email address, and sometimes additional details. They may also need to set up access credentials, such as, for example, a username and password, or use alternative authentication methods like social media logins, phone numbers, or biometric data.

Once an account is created, users may log in by visiting the service's website or using dedicated applications, providing (entering) their access credentials. Some services might require additional security measures like multi-factor (e.g., two-factor) authentication (2FA) to enhance account security.

Ultimately, the process of logging into online services is foundational to accessing the vast array of resources and functionalities available on the internet, facilitating convenient and efficient interaction in our digital world.

SUMMARY OF THE INVENTION

According to a first aspect of the present invention there is provided a method of increasing security of access to online accounts, comprising using one or more processors for resetting access credentials of one or more accounts of one or more online services of one or more users, by: (i) transmitting an access credentials reset request, (ii) intercepting one or more credentials reset messages transmitted via one or more correspondence channels associated with the one or more users, the one or more credentials reset messages comprise a credentials reset network address, and (iii) accessing the credentials reset network address to replace existing access credentials for the one or more accounts with increased security credentials. Wherein one or more automated access agents adapted to automatically login the one or more users into the one or more online services uses the increased security credentials to login to the one or more accounts.

According to a second aspect of the present invention there is provided a system for increasing security of access to online accounts, comprising one or more processors configured to execute a code. The code comprising code instructions to reset access credentials of one or more account of one or more online service of one or more user, by: (i) transmitting an access credentials reset request, (ii) intercepting one or more credentials reset message transmitted via one or more correspondence channel associated with the one or more user, the credentials reset message comprises a credentials reset network address, and (iii) accessing the credentials reset network address to replace existing access credentials for the one or more account with increased security credentials. Wherein one or more automated access agent adapted to automatically login the one or more user into the one or more online services uses the increased security credentials to login to the one or more account.

In an optional implementation form of the first, and/or second aspects, permission of one or more of users to access the one or more accounts is revoked by resetting the access credentials to replace the existing access credentials with updated credentials and discarding the updated credentials.

In a further implementation form of the first, and/or second aspects, the increased security credentials are generated in real-time and updated a secure credentials repository accessible to the one or more automated access agent.

In a further implementation form of the first, and/or second aspects, the increased security credentials are predefined and retrieved from a secure credentials repository accessible to the one or more automated access agents.

In a further implementation form of the first, and/or second aspects, the one or more credentials reset messages are detected by analyzing messages received by the user via his associated one or more correspondence channels.

In a further implementation form of the first, and/or second aspects, the messages are analyzed using natural language processing.

In an optional implementation form of the first, and/or second aspects, one or more privacy filters are applied to prevent exposure of private data contained in the messages.

In a further implementation form of the first, and/or second aspects, the one or more correspondence channels are members of a group consisting of: one or more email accounts associated with the respective user, phone number of one or more client devices associated with the respective user, and/or a unique network identifier of one or more client devices associated with the respective user.

In an optional implementation form of the first, and/or second aspects, the increased security credentials stored in the secure credentials repository are encrypted.

In a further implementation form of the first, and/or second aspects, one or more of the accounts are shared accounts accessible to a plurality of users.

In a further implementation form of the first, and/or second aspects, resetting the access credentials to one or more of the accounts is done periodically according to a predefined time interval.

In a further implementation form of the first, and/or second aspects, resetting the access credentials to one or more of the accounts is done on command in response to a reset command.

In a further implementation form of the first, and/or second aspects, one or more of the automated access agents is invoked automatically in response to a login action of the one or more users for accessing the one or more accounts.

In a further implementation form of the first, and/or second aspects, one or more of the automated access agents are adapted to automatically log the one or more users into a plurality of accounts of a plurality of online services after initiating a plurality of credentials reset sequences in which the access credentials to each of the plurality of accounts is updated to include respective increased security credentials, the respective increased security credentials of the plurality of accounts are stored in a secure credentials repository.

In a further implementation form of the first, and/or second aspects, one or more of the users log into each of the plurality of accounts by activating the one or more automated access agents using a single set of access credentials.

In a further implementation form of the first, and/or second aspects, one or more of the automated access agents are executed by one or more client devices used by the one or more users to log into the one or more accounts. The one or more automated access agents are implemented by one or more of: a web browser adapted to embed automated access functionality, and/or one or more dedicated applications.

In a further implementation form of the first, and/or second aspects, one or more of the automated access agents are executed by one or more remote servers in communication, via one or more network, with one or more client devices used by the one or more users to log into the one or more accounts.

In a further implementation form of the first, and/or second aspects, one or more of the online services comprise a Software as a Software (SaaS) service.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

Figure 3:
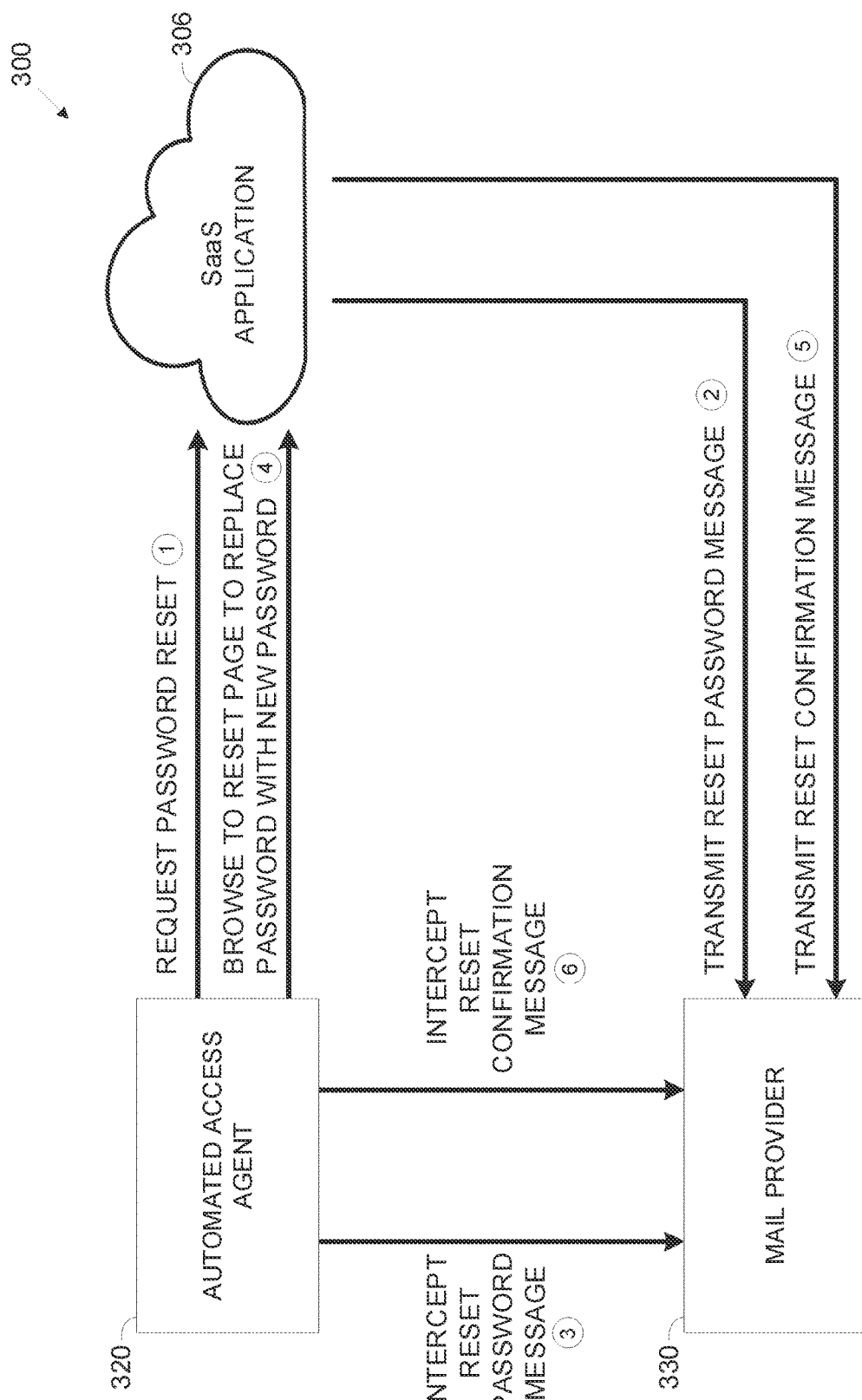
Figure 4:
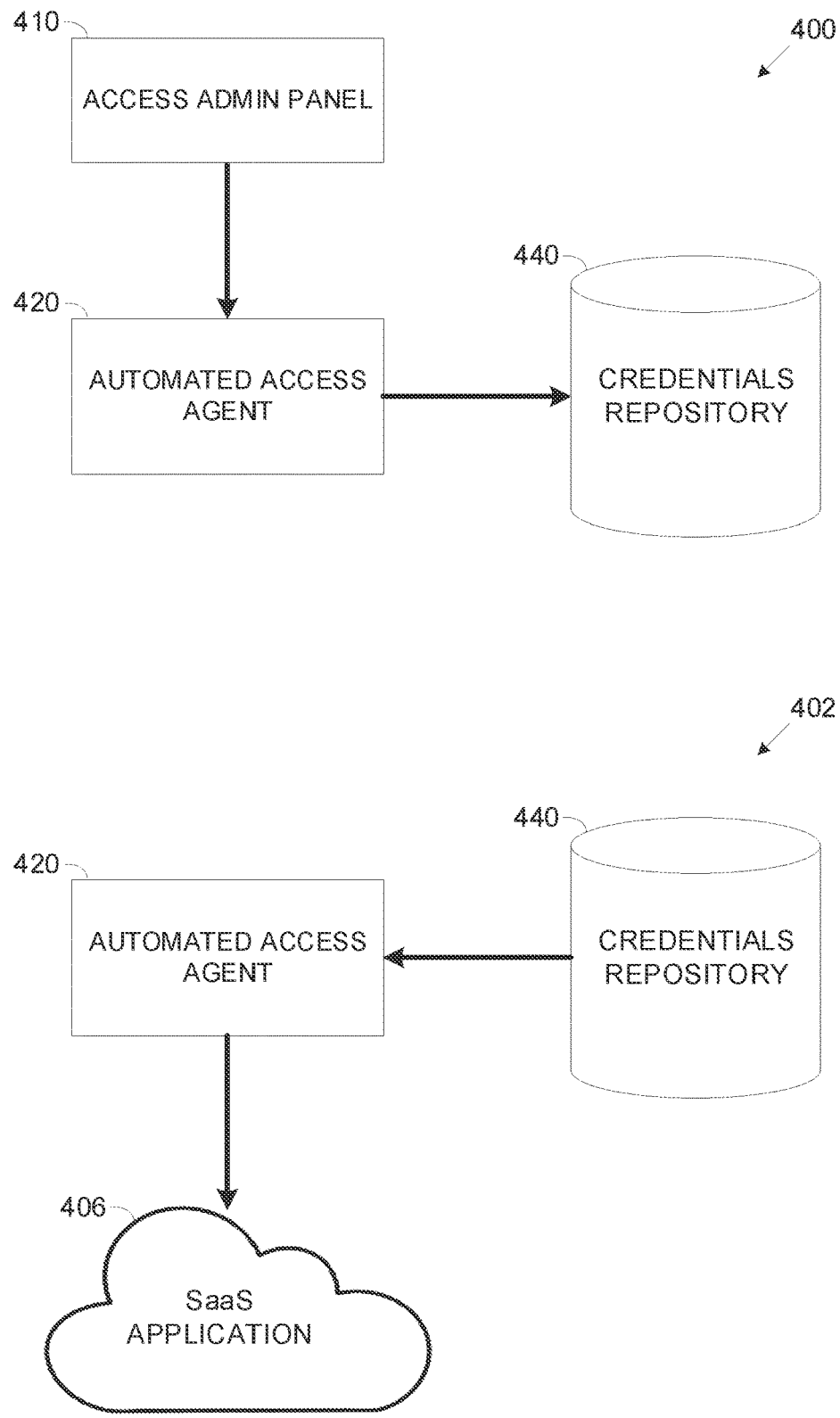

FIG. 3 is a schematic illustration of an exemplary sequence of automatically resetting access credentials for online accounts to increase security of accessing them, according to some embodiments of the present invention; and FIG. 4 presents schematic illustrations of an exemplary sequences of automatically controlling access to online accounts to increase security of accessing them, according to some embodiments of the present invention.

DESCRIPTION OF SPECIFIC EMBODIMENTS
OF THE INVENTION

The present invention, in some embodiments thereof, relates to increasing security of access to online accounts and, more specifically, but not exclusively, to increasing security of access to online accounts by automatically resetting login access credentials for the online accounts and replacing them with increased security credentials.

Controlling access credentials for accounts of online services, for example, user names, account identifiers (ID), passwords, codes, tokens, and/or the like may be a challenging task since the access credentials need to be maintained secure and private (confidential) while accessible and available to the users.

This challenge may be dramatically increased for entities, for example, corporates, companies, organizations, institutes, agencies and/or the like storing sensitive, confidential, and/or secret information in multiple private and/or group accounts on a plurality of online services accessible by a large number of users (e.g., employees, sub-contractors, suppliers, customers, etc.) since in addition to security, privacy and/or accessibility concerns, additional policies may typically apply to users and/or user groups, for example, access permission, privileges, and authorization, access level and privileges hierarchy, restrictions on used terminal (e.g., client devices), and/or the like.

According to some embodiments of the present invention, there are provided methods, systems and computer program products for increasing security of access to accounts in online services by automatically resetting login access credentials for the online accounts and replacing them with increased security credentials.

An access agent may be adapted to automatically initiate a reset operation for resetting the access credentials of one or more users for one or more accounts at one or more cloud services, for example, a cloud service, an online application, a cloud platform, a Software as a Service (SaaS) application, and/or the like and replacing the existing access credentials with increased security credentials.

The access agent, which may be executed locally by one or more client devices used by users to access the online accounts and/or remotely by an automated access service, may automatically issue a credentials reset request to one or more of the online services for resetting and updating the access credentials for one or more users.

In response to the credentials reset request, each online service may transmit a credentials reset address, for example, a link to a webpage, a Unified Resource Locator (URL), and/or the like where the access credentials may be reset and updated.

The access agent may therefore monitor one or more correspondence channels associated with the user(s), for example, email messages, text messages and/or the like to intercept the credentials reset message(s) received from the online service(s).

The access agent may analyze the intercepted credentials reset message(s) to identify and extract the credentials reset address. The access agent may employ one or more language analysis tools to analyze the credentials reset message(s), for example, Natural Language Processing (NLP), and/or the like, optionally using one or more privacy filters to prevent exposure and/or leakage of private data included in the message(s).

Using the extracted credentials reset address, the access agent may access automatically the credentials reset address to reset the current access credentials of the users and replace them with increased security access credentials.

The increased access credentials may be highly complex to ensure their security and privacy, for example each password, access code, and/or the like may each comprise a long string of randomly selected characters, for example, letters, digits, symbols and/or the like.

The increased access credentials may comprise credentials generated in real-time during the access credentials reset process and/or predefined access credentials generated in advance, for example, by one or more access management (admin) credentials generation tools, services, applications, and/or systems adapted to generate, maintain, control, and/or update access credentials to online services for the a plurality of users and store them in a secure credentials repository accessible to the access agent. For example, a corporate access management tool adapted to control access credentials for many users associated with a corporate may generate predefined access credentials for one or more users and/or users groups to one or more accounts at one or more online services used by the corporate.

The secure credentials may be stored in a secure credentials repository accessible to the access agent such that the access agent may retrieve predefined increased security access credentials and/or store increased security access credentials generated in real-time.

Optionally, the access agent may discard, delete, and/or otherwise remove the credentials reset message(s) as well as one or more additional messages relating to the access credentials reset and update, for example, a reset confirmation message, a credentials update message, and/or the like such that the messages are not accessible and/or not even exposed to the users.

The automated access agent may be also adapted to automatically log-in the users to one or more of the online services accounts using the increased security access credentials retrieved from the secure credentials repository.

The automated access agent may optionally employ Single Sign On (SSO) to enable one or more users to log into a plurality of online account of one or more online services using a single set of access credentials. For example, the user(s) may use a single set of access credentials to activate the access agent which may automatically access one or more accounts at one or more online services using respective increased security access credentials retrieved from the secure credentials repository.

Optionally, the automated access agent may be adapted to "off-board" one or more of the users, i.e., revoke their permission to access one or more accounts at one or more of the online services by resetting the access credentials of the respective user to the respective account such that it is no longer available to the respective user who is now blocked from accessing the respective account.

Optionally, the access agent may discard the newly updated access credentials and avoid updating it in the secure credentials repository such that access to the respective account is completely prevented.

Optionally, the access agent may delete one or more accounts of one or more users and/or user group at one of more of the online services, for example, by accessing settings of the respective account and deleting it.

Automatically resetting and updating access credentials of users to accounts of online services and replacing them with increased security access credentials may present major benefits and advantages compared to existing credentials management methods and systems.

First, users may typically use simple access credentials (e.g., passwords) for accessing online accounts which may be easy to maliciously recover and/or compromise and may further use the same access credentials for accessing multiple different online accounts. This mode of use of the access credentials may be exploited by malicious parties in attempt to gain access to the online accounts which may store private, secret, and/or sensitive information.

This limitation may be significantly mitigated by automatically updating the access credentials to include increased security access credential which are significantly difficult and typically impossible thus increasing security, immunity and/or robustness of the online account against malicious and/or fraudulent access. Also, since the users may not be exposed to the increased access credentials and therefore don't know security, immunity and/or robustness of the online accounts may be further increased.

Moreover, employing the automated access agent for automatically logging users into online accounts may enable supervised and/or centralized access control for entities having a large number of users (e.g., employees, subcontractors, suppliers, customers, etc.) accessing a plurality of accounts at a plurality of online services since the access credentials may be managed by specific IT personal according to strict rules rather than by the users themselves thus significantly improving permission control (e.g., access authorization and/or revocation, etc.), access tracking, accounts security, and/or the like. Also, since access of users, for example, corporate users to online accounts may be fully controlled by IT personnel and teams, access of these users may be easily enabled (on-boarded) and/or revoked (off-boarded), thus ensuring efficient and rapid access control for authorized users only. For example, access to the corporate accounts may be swiftly revoked for former employees who may otherwise access such online accounts with ill intent.

Furthermore, adapting the automated access agent to employ SSO like authentication, may allow the users use a single set of access credentials to activate the automated access agent which in turn may automatically access the online accounts on behalf of the users using the increased security access credentials without exposing these increased security access credentials to the users thus further increasing security, immunity and/or robustness of the online account to malicious cyberattacks, for example, phishing.

This SSO like scheme may also significantly improve user experience of the users who may be relieved of the burden to manually access the online services' accounts using complex access credentials. Adapting the automated access agent to support SSO like authentication may also eliminate the need to use, adopt and/or deploy external (3$^{rd}$ party) SSO tools which may significantly reduce deployment and/or maintenance cost, effort, time, and/or resources, reduce integration complexity, and/or reduce dependency on other vendors.

In addition, automatically resetting the access credentials, with no intervention by the users and optionally completely seamlessly to the users, may further increase their user experience since they are not burdened with executing the credentials reset and update process which may be very tedious and/or time consuming.

Also, applying privacy filter(s) during analysis of the users' messages which may contain private, secret, and/or sensitive data may significantly increase safety, security and/or privacy of this data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Python, Java, Scala, Smalltalk, C++ or the like, and conventional procedural programming languages, such as the "C" programming language or similar programming languages including and not limited to statistical languages such as, for example, R, MATLAB, SPSS, Statistica, SAS/JMP, and/or the like.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
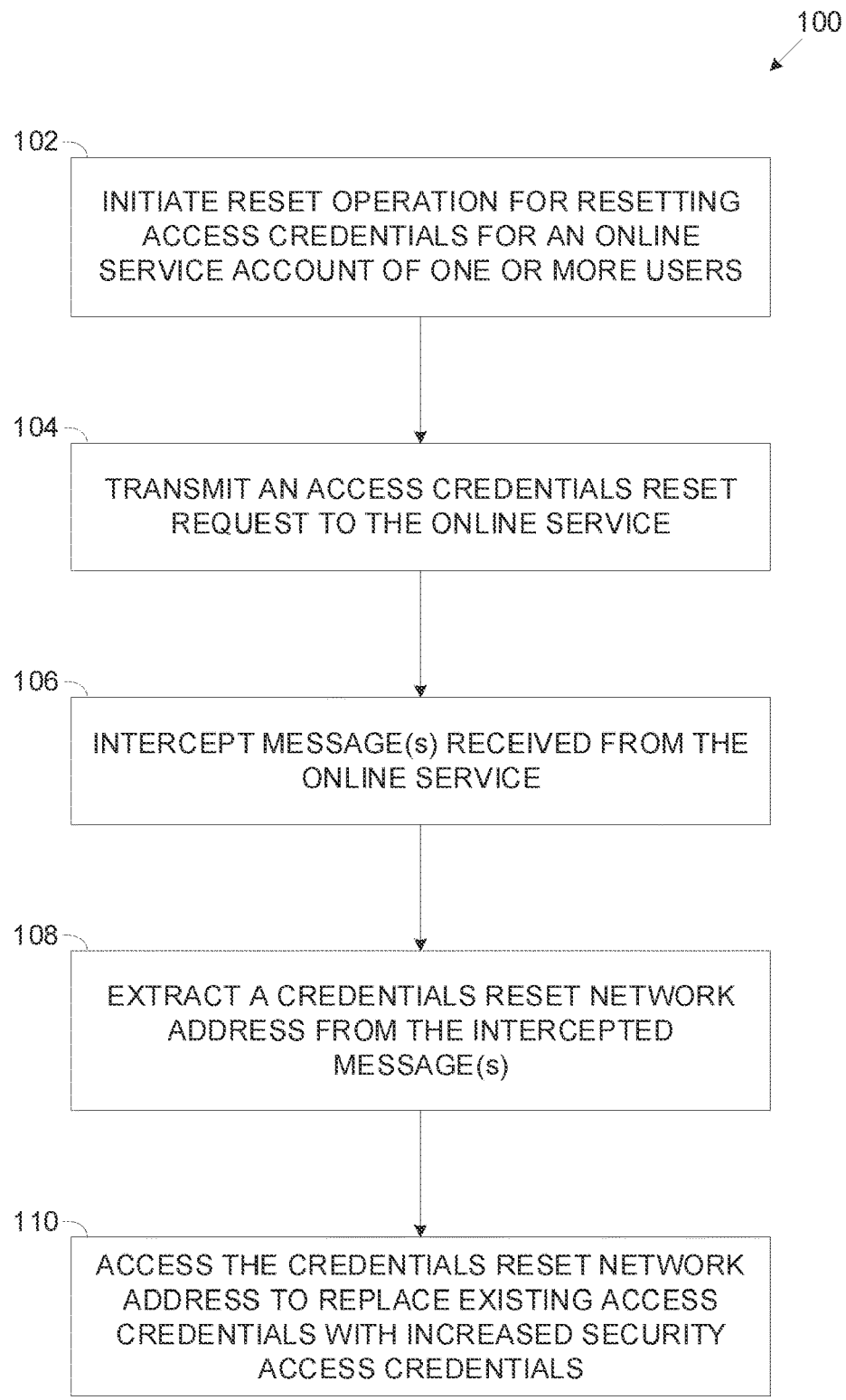
FIG. 1 is a flowchart of an exemplary process of automatically resetting access credentials for online accounts to increase security of accessing them, according to some embodiments of the present invention.

Referring now to the drawings, FIG. 1 is a flowchart of an exemplary process of automatically resetting access credentials for online accounts to increase security of accessing them, according to some embodiments of the present invention.

An exemplary process 100 may be executed to reset access credentials of one or more users to one or more online accounts at one or more online services in order to increase security of access to these accounts.

An automated access agent deployed and executed by client devices used by the users to access the online accounts may automatically issue a credentials reset request to one or more of the online services. The access agent may then monitor correspondence channels of the users (e.g., email, text messages, etc.), intercept credentials reset messages transmitted back to the users from the online services and extract credentials reset addresses (e.g., webpage, URL, etc.) from the intercepted messages.

The access agent may then access automatically credentials reset addresses to reset the existing access credentials of the users and replace them with increased security access credentials which optionally may be stored in a secure credentials repository.

Moreover, when accessing the online services, the user may log-in through the access agent which may retrieve the access credentials and access the users' accounts thus eliminating the need for the users to do so manually which prevents exposure of the access credentials may further increasing their security and privacy.

Figure 2:
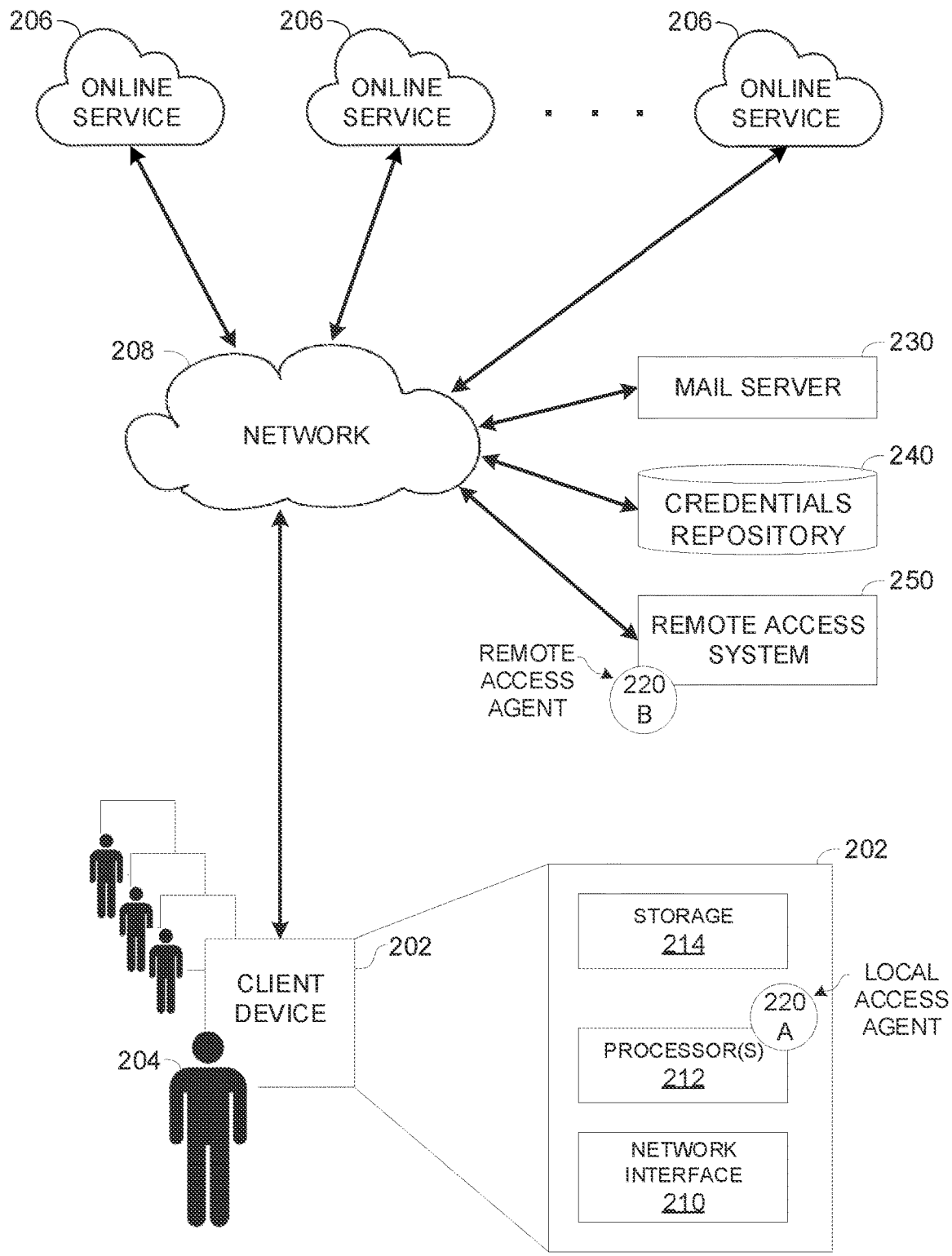
FIG. 2 is a schematic illustration of an exemplary system for automatically resetting access credentials for online accounts to increase security of accessing them, according to some embodiments of the present invention.

Reference is also made to FIG. 2, which is a schematic illustration of an exemplary system for automatically resetting access credentials for online accounts to increase security of accessing them, according to some embodiments of the present invention.

A plurality of users 204 may use respective client devices 202, for example, a desktop, a laptop, a Smartphone, a tablet, and/or the like to access one or more online services 206, for example, a cloud service, an online application, a cloud platform, a SaaS application, and/or the like.

The online services 206 may be comprise, for example, enterprise related services such as, for example, Lucidchart, Navan, CircleCI, Salesforce, Slack, Time Doctor, BambooHR, to name just a few. In another example, the online services 206 may include other services, for example, private and non-work related services, such as, for example, social media, online shopping, gaming, financial accounts (bank, credit card, cryptocurrency, etc.), and/or the like.

In particular, each of the users 204 may access one or more online accounts at the online services 206 using respective access credentials created for respective users 204, for groups of users 204, and/or a combination thereof, for example, during registration to the online services 206, by IT personnel allocating access permissions, and/or the like.

The client devices 202 may communicate with the online services 206 via a network 208 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Each client devices 202, for example, a desktop, a laptop, a Smartphone, a tablet, and/or the like may comprise a network interface 210 for connecting to the network 208, a processor(s) 212 for executing the process 100, and a storage 214 for storing data and/or code (program store).

The network interface 210 may comprise one or more wired and/or wireless network adapters, implemented via hardware, software, and/or a combination thereof, for connecting to the network 208. Via the network 208 the client devices 202 may communicate with one or more of the online services 206.

Optionally, one or more of the client devices 202 may further communicate, over the network 208, with one or more mail providers 230, for example, a company mail server, a cloud email service (e.g., Gmail, etc.), and/or the like. Moreover, via the network 208, one or more of the client devices 202 may optionally communicate with one or more credentials repositories 240, for example, a storage severe, a cloud storage service, a database and/or the like adapted to store access credentials of one or more of the users 204 for one or more of the online accounts at one or more of the online services 206.

The processor(s) 212, homogenous or heterogeneous, may include one or more processing nodes and/or cores arranged for parallel processing, as clusters and/or as one or more multi core processor(s). The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile devices, for example, a Random Access Memory (RAM) component, a cache and/or the like.

The processor(s) 212 may execute one or more software modules such as, for example, a process, a script, an Operating System (OS), an application, an agent, a utility, a tool, a plug-in, an add-on, and/or the like each comprising a plurality of program instructions stored in a non-transitory medium (program store) such as the storage 214 and executed by one or more processors such as the processor(s) 212.

Optionally, the processor(s) 212 of one or more of the client devices 202 may include, utilize, and/or use one or more hardware elements available to the respective client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator, and/or the like.

The processor(s) 212 may therefore execute one or more functional modules utilized by one or more software modules, one or more of the hardware elements and/or a combination thereof. For example, the processor(s) 212 may execute an access agent 220, specifically a local access agent 220A adapted to execute the process 100 and/or part thereof for automatically resetting access credentials of one or more of the users 204 for one or more online accounts at one or more of the online services 206.

The local access agent 220A may be implemented, deployed and executed by each of the client devices 202 according to one or more methods, techniques and/or deployments.

For example, the local access agent 220A may be implemented as an extension, plug-in, and/or add-on module added to web browsers executed by the client device and used by the user 204 to access one or more of the online services 206, for example, Chrome, Edge, Firefox, Opera, and/or the like.

In another example, For example, the local access agent 220A may be executed by one or more of the client devices 202 as a standalone application which may communicate with one or more of the online services 206 via one or more web browsers used by the user 204 to access the online services 206. In such deployments the local access agent 220A may communicate with the web browser(s) using one or more Application Programming Interface (API) functions of the web browser, OS system calls, and/or the like.

In another example, the local access agent 220A comprising a standalone application and/or integrated in one or more other applications executed by the client device 202 may be developed, designed, and/or deployed using one or more Software Development Kits (SDK) which may expose, facilitate, and/or implement the functionality, features, and/or capabilities required for executing the process 100.

According to some embodiments, the access agent 220 may comprise a remote access agent 220B executed by one or more remote servers 250 and adapted to execute the process 100 and/or part thereof. In such case, the remote access agent 220B may communicate with the local access agent 220A to receive and/or transmit, via the network 208, data relating to the process 100. The remote server 250 may be adapted to execute the remote access agent 220B, for example, as a dedicated service. In another example, the remote access agent 220B may be developed, designed, and/or deployed, for example, embedded in one or more remoter webpages, and/or services using one or more SDKs exposing facilitating, and/or implementing the functionality, features, and/or capabilities required for executing the process 100.

For brevity, the process 100 is described to be executed by the access agent 220 regardless of its exact deployment scheme. i.e., implemented by the local access agent 220A, by the remote access agent 220B, and/or a combination thereof. As stated herein before, in a combined deployment data may be exchanged between the local access agent 220A and the remote access agent 220B via the network 208.

It should be noted that the process 100 may be completely transparent to the users 204 which may be thus oblivious to the process 100 undergoing for resetting their access credentials to one or more of their online accounts at one or more cloud services 206.

Also for brevity, the processes 100 is described for resetting and/or replacing access credentials for a single online account at a single online service 206 using a single client device 202 used by a single user 204. This, however, should not be construed as limiting since, as may become apparent to a person skilled in the art, the process 100 may be duplicated, expanded, and/or scaled for resetting and/or replacing access credentials of a plurality of online accounts at a plurality of online services 206 using one or more client devices 202 used by a plurality of users 204.

As shown at 102, the process 100 may start with the access agent 220 initiating an operation to reset the access credentials of one or more users 204 for an online account at an online service 206.

The access agent 220 may initiate the access credentials reset operation in response to one or more actions, events, and/or rules. For example, the access agent 220 may initiate the reset operation according to one or more rules defining period, and/or timed scans for online services 206 for which there are active online accounts on the client device 202. For example, the access agent 220 may initiate the access credentials reset operation periodically according to a predefined time interval, for example, once a month, once a week, and/or the like. In another example, the access agent 220 may initiate the reset operation in response to one or more reset commands and/or instructions received from one or more systems, devices, and/or services, for example, an IT person (through his client device), a corporate access management system, a service monitoring accesses to cloud services 206, and/or the like. In another example, the access agent 220 may initiate the reset operation in response to detecting an access to the online service made by the user 204 using the client device 202.

The online account may be a private account used and accessible to a single user 204. However, optionally, the online account may be a shared account accessible to a plurality of users 204, For example, a team of group of users 204, for example, an integration team may share a common online account in one or more online integration services, for example, CircleCI. In another example, a group of users 204, for example, a team of developers may share an online account for a common project they are all involved in an online code repository, for example, Subversion (SVN). a group of users 204, for example, a team of developers may share an online account for a common project they are all involved in an online code repository, for example, Apache Subversion (SVN).

As shown at 104, the access agent 220 may transmit an access credentials reset request to the online service 206.

For example, the access agent 220 may initiate a "forgot my password" procedure at the online service 206. In another example, the access agent 220 may access the settings of the online account to request resetting the access credentials for the online account.

As shown at 106, the access agent 220 may intercept one or more credentials reset messages transmitted, for example, by the online service 206, in response to the request to reset the access credentials reset.

The credentials reset message(s) may comprise a credentials reset network address in which the access credentials for the online account may be reset, for example, a password, a key, a code, a user name, and/or the like and new access credentials may be provided, and/or set. The credentials reset network address may include, for example, a link to a webpage where the access credentials may be reset and new access credentials may be provided. In another example, the credentials reset network address may include a URL of a network resource where the access credentials may be reset and new access credentials may be provided.

The credentials reset message(s) transmitted, for example, by the online service 206 may be transmitted via one or more correspondence channels associated with the user 204. Such correspondence channels may include, for example, an email account associated with the user 204. In such case, the credentials reset message(s) may include one or more email messages transmitted to the email account of the user 204.

In another example, the correspondence channels may include a phone number, for example, a phone number, an international mobile subscriber identity (IMSI) number, an Mobile Station Integrated Services Digital Network (MSISDN) number, and/or the like of the client device 202 associated with the user 204. In such case, the credentials reset message(s) may include one or more text messages transmitted to the client device 202 of the user 204 using the phone number of the client device 202, for example, a Short Messaging Service (SMS) message, a WhatsApp message, and/or the like.

In another example, the correspondence channels may include one or more voice messaging applications associated with a unique network identifier of the client device 202 associated with the user 204, for example, a Media Access Controller (MAC) address, MSISDN, and/or the like. In such case, the credentials reset message(s) may include one or more voice messages transmitted to the client device 202 of the user 204 using the unique identifier of the client device 202.

As shown at 106, the access agent 220 may intercept the received credentials reset message(s).

Specifically, the access agent 220 may intercept the credentials reset message(s) by analyzing messages received by the user 204 via his associated one or more correspondence channels. For example, the access agent 220 may access, via the network 208, one or more of the mail servers 230 to analyze email messages received at the email account associated with the user 204 and may fetch the credentials reset message(s) identified in the mail account. In another example, the access agent 220 may access a local email account of the user 204 at the client device 202 to analyze received email messages and fetch the received credentials reset message(s). In another example, the access agent 220 may access one or more text message queues of one or more of the text message applications executed by the client device 202 to analyze received text messages and fetch the received credentials reset message(s). In another example, the access agent 220 may access one or more voice message queues at one or more of the voice message applications executed by the client device 202 to analyze received text messages and fetch the received credentials reset message(s).

The access agent 220 may apply one or more text and/or language analysis methods, and/or algorithms, for example, Natural Language Processing (NLP) to analyze the messages received at the correspondence channel(s), for example, email messages, text messages, voice messages, and/or the like.

Optionally, the access agent 220 may apply one or more privacy filters to prevent exposure of private, secret, sensitive, and/or confidential data contained in the messages analyzed by the access agent 220 to identify the credentials reset message(s). Such privacy filter may be adapted prevent exposure of the access agent 220 to private information contained in the messages, for example, personal details (e.g., name, address, age, gender, address, job title, etc.), sensitive data (e.g., bank account data, credit card details, etc.), private data (e.g., private text expressed in the message, etc.), and/or the like.

Moreover, the access agent 220 may intercept the credentials reset message(s) before the user 204 accesses and/or sees it in order to prevent the user 204 from conducting actions relating to the access credentials thus preventing the user 204 from interfering with the automated access credentials reset process conducted by the access agent 220. The access agent 220 may also prevent and/or block notifications generated, for example, by the email App, by the text message App, and/or the like to inform the user 204 of arrival and/or reception of the credentials reset message(s), for example, a sound notification, a visual notification (e.g., banner message, pop-up, etc.) such that the user 204 may be unaware of the credentials reset process.

As shown at 108, the access agent 220 may extract the credentials reset network address from the credentials reset message(s), for example, the link to the credentials reset webpage, the URL of the credentials reset network resource, and/or the like.

Optionally, the access agent 220 may delete, discard, and/or otherwise remove the credentials reset message(s), for example, email message(s), text message(s), etc. such that they are no longer available, for example, to the user 204 who may be therefore completely unaware of the access credentials reset operation.

As shown at 110, the access agent 220 may reset the access credentials for the online account, and more specifically replace the existing access credentials with updated access credentials, in particular increased security access credentials.

The increased access credentials may be highly complex to ensure their security and privacy, for example, a long string of randomly selected characters, for example, letters, digits, symbols and/or the like.

The increased access credentials may be generated using one or more methods, techniques, and/or algorithms. For example, the increased access credentials may be generated in real-time, for example, by the access agent 220, and/or by one or more other credentials generation tools, services, and/or applications. In another example, the increased access credentials may be predefined and stored in a secure credentials repository. The predefined increased access credentials may be generated and stored in the secure credentials repository, for example, by one or more access management services, applications, and/or systems adapted to generate, maintain, control, and/or update access credentials to online service 206 for the user 206, for example, a corporate access management tool adapted to control the access credentials to online service 206 for corporate user 206.

The secure credentials repository may comprise, for example, the secure credentials repository 240 accessible to the access agent 220 via the network 208. In another example, the secure credentials repository may include a local repository, for example, a record, a file, a list, a table, and/or the like stored in the storage 214 of the client device 202, in particular in a secure storage, for example, a password protected folder, a protected partition, and/or the like.

One or more methods, techniques, and/or algorithms may be applied for generating the increased security access credentials. For example, the increased security access credentials may be generated according to one or more rules, for example, credentials string size, type of characters (letters, digits symbols, etc.) and/or the like optionally using one or more random and/or pseudo-random generators for selecting the characters. In another example, one or more code generation, password generation, and/or secret generation algorithm as known in the art may be used for generating the increased security access credentials. In another example, the increased security access credentials may be received from one or more code generation, password generation, and/or secret generation tools, applications, and/or agents executed locally at the client device 202 and/or remotely by one or more remote servers and/or cloud services accessible over the network 208.

Optionally, the access agent 220 may retrieve predefined increased security credentials from the secure credentials repository 240, and/or from the local storage 214 of the client device 202 and replace the existing access credentials with the predefined increased security credentials. The predefined increased security credentials stored in the secure credentials repository 240 and/or in the local storage 214 may be generated by one or more access credentials management tools, systems, agents and/or services, for example, an admin service, an admin dashboard, and/or the like adapted to define access credentials for online services and websites 206 and assign users 206 to online accounts, allowing them to seamlessly log-in to those websites using the predefined credentials.

Optionally, the access agent 220 may delete, discard, and/or otherwise remove the one or more additional messages received from the online service 206 in response to the access credentials reset and update operation, for example, a reset confirmation message, a credentials update message, and/or the like to further prevent exposure of these messages to the user 204 who may be left unaware of the access credentials reset operation.

Optionally, for example, in case the increased security credentials are generated in real-time during the process 100, the access agent 220 may update the increased security credentials in the secure credentials repository, for example, the secure credentials repository 240 and/or the local storage 214.

The secure credentials repository may be accessible to one or more automated access agents adapted to automatically log the user 204 into the online account at the online service 206 using the increased security credentials. Such automated access agent(s) may therefore access the secure credentials repository, after the credentials reset process is successfully complete, to fetch the stored increased security credentials and use them to log the user 204 into the online account.

While the automated access agent adapted to automatically log the user 204 into the online account using the increased security credentials fetched from the secure credentials repository may be an independent functional module, optionally and/or typically this automated access agent may be implemented, utilized and/or integrated with the access agent 220. Therefore, for brevity, the access agent 220 is described herein after to log the user 204 into the online account at the online service 206 using the increased security credentials.

The access agent 220 may monitor at least some of online activity of the user 204 to identify accesses made by the user 204 to one or more online accounts at the online service 206. For example, assuming the access agent 220 comprises the local access agent 220A integrated and/or added to the web browser used by the user 204, the local access agent 220A may directly detect such accesses from within the web browser. In another example, assuming the access agent 220 comprises a standalone local access agent 220A, the local access agent 220A may communicate with the web browser, for example, using its API to identify accesses made to the online service 206. In another example, assuming the access agent 220 comprises the remote access agent 220B, the remote access agent 220B may communicate with the web browser via the network 208 and/or monitor accesses to the online service 206 to identify accesses made to the online service 206.

Optionally, the access agent 220 may be further adapted to encrypt the increased security credentials stored in the secure credentials repository. The access agent 220 may use one or more encryption methods, and/or algorithms, as known in the art, for symmetric and/or asymmetric encrypting the increased security credentials, for example, hashing, Advanced Encryption Standard (AES), Data Encryption Standard (DES), and/or the like.

Optionally, the access agent 220 may be further adapted to off-board the user 204 and revoke his permission to access the account at the online service 206 by executing the process 100 to reset the access credentials to replace the existing access credentials with updated access credentials. As such, the user 204 having no access and/or knowledge of the updated access credentials may be unable to access the online account. Off-boarding the user 204 may be done, for example, for an employee leaving the company and blocked from accessing one or more restricted online accounts, private and/or shared, which are accessible only by employees.

Moreover, optionally, the access agent 220 may be further adapted to discard the updated credentials such that the online account may not be accessed by anyone including the off-boarded user 204 as well as other parties for example, other users 204, IT personnel, and/or the like. This may be typically done for private online accounts associated with an off-boarded user 204.

Optionally, the access agent 220 may be adapted to delete, close, and/or remove the online account at the online service 206 such that the online account no longer exists including its stored data and obviously no longer available to anyone. This may be also typically done for private online accounts associated with an off-boarded user 204.

The automated access agent, for example, the access agent 220, adapted to automatically log the user 204 into one or more online account at one or more online services 206 using the increased security credentials created for the respective online account and fetched from the secure credentials repository may be adapted to initiate the login request in response to a login action initiated by the user 204 for logging into the online account.

For example, the access agent 220 may detect that the user 204 launches a certain online service 206, for example, a certain SaaS application in which the user 204 has an online account, specifically an account whose access credentials were previously reset and replaced with increased security credentials. In such case, the access agent 220 may access the secure credentials repository, fetch the increased security credentials and provide them to the online SaaS service on behalf of the user 204.

In another example, the access agent 220 may detect that the user 204 browses to a webpage of a certain online service 206 in which the user 204 has an online account, specifically an account whose access credentials were previously reset and replaced with increased security credentials. In such case, the access agent 220 may access the secure credentials repository, fetch the increased security credentials and provide them to the online SaaS service on behalf of the user 204.

Optionally, in order to log into the online accounts at the online services 206, the user may launch the access agent 220 which may automatically log the user 204 into the online account. The user 206 may be requested to provide his credentials for launching and/or initiating the access agent 220 which may be typically significantly simpler and less difficult to remember and type in.

Moreover, the automated access agent, for example, the access agent 220, may be further adapted to automatically log the user 204 into a plurality of online accounts of one or more online services 206. In particular, the access agent 220, may be adapted to automatically log the user 204 into a plurality of online accounts after initiating a plurality of credentials reset sequences in which the access credentials to each of the plurality of online accounts is updated to replace existing access credentials with respective increased security access credentials. As described in step 114 of the process 100, the plurality of increased security access credentials updated for the plurality of online accounts may be stored in the secure credentials repository 240.

The access agent 220 may optionally apply one or more Single Sign On (SSO) authentication schemes, as known in the art, to enable the user 204 to log into a plurality of online account of one or more online services 206 using a single set of access credentials. For example, the user 204 may use a single set of access credentials, for example, a user ID and a password, biometric authentication, and/or the like to activate the access agent 220 which may launch and access one or more of the plurality of online accounts using respective increased security access credentials retrieved from the secure credentials repository 240. In particular, the access agent 220 may launch and access online accounts according to predefined settings and/or in response to selection by the user 204.

Reference is now made to FIG. 3, which is a schematic illustration of an exemplary sequence of automatically resetting access credentials for online accounts to increase security of accessing them, according to some embodiments of the present invention.

An exemplary sequence 300 may be executed by an automated access agent 320 such as the access agent 220 to reset the access credentials, for example, a password, of one or more users such as the users 204 to one or more online accounts at one or more online services such as the online services 206, for example, a SaaS application 306.

As seen, the automated access agent 320 may initiate a password reset sequence as described in the process 100 by transmitting a password reset request (1). In response the SaaS application 306 may transmit a reset password message (2) comprising an address to a credentials reset network resources, for example, a link to a credentials reset webpage.

The automated access agent 320 may intercept the reset password message (3), extract the credentials reset network address and browse to the credentials reset webpage to reset the password to the online account at the SaaS application 306 and replace the password with another password, specifically an increased security password (4).

Optionally, in response to the password reset operation, the SaaS application 306 may transmit a reset confirmation message (5) which the automated access agent 320 may also intercept (6).

Reference is now made to FIG. 4, which presents schematic illustrations of an exemplary sequences of automatically controlling access to online accounts to increase security of accessing them, according to some embodiments of the present invention.

As seen in exemplary sequence 400, an access admin panel 410 operating automatically and/or manually operated by IT personnel, for example, an admin service, an admin portal, and/or the like may be adapted to generate one or more predefined increased access credentials, for example, a password, a code, and/or the like for one or more users such as the users 204 to one or more online accounts at one or more online services such as the online services 206. The access admin panel 410 may operate and/or instruct an automated access agent 420 such as the access agent 220 to store the predefined increased access credentials in a secure credentials repository 440 such as for example, the secure credentials repository 240 and/or the local storage 214.

As seen in exemplary sequence 402, the automated access agent 420 may then execute a process such as the process 100 to reset the password of one or more of the online accounts and replace the existing passwords with the predefined increased security passwords retrieved from the secure credentials repository 440.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms password generation algorithms and tools, SSO schemes, and encryption algorithms are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of increasing security of access to online accounts, comprising:
    using at least one processor for:
        resetting access credentials of at least one account of at least one online service of at least one user, by:
        transmitting an access credentials reset request,
        intercepting at least one credentials reset message transmitted via at least one correspondence channel associated with the at least one user, the at least one credentials reset message comprises a credentials reset network address, and
        accessing the credentials reset network address to replace existing access credentials for the at least one account with increased security credentials;
        revoking permission of the at least one user to access the at least one account by resetting the access credentials to replace the existing access credentials with updated credentials and discarding the updated credentials;
    wherein at least one automated access agent configured to automatically login the at least one user into the at least one online service uses the increased security credentials to login to the at least one account.

2. The method of claim 1, wherein the increased security credentials are generated in real-time and are updated in a secure credentials repository accessible to the at least one automated access agent.

3. The method of claim 1, wherein the increased security credentials are predefined and retrieved from a secure credentials repository accessible to the at least one automated access agent.

4. The method of claim 1, wherein the at least one credentials reset message is detected by analyzing messages received by the user via his associated at least one correspondence channel.

5. The method of claim 4, wherein the messages are analyzed using natural language processing.

6. The method of claim 1, wherein the at least one correspondence channel is a member of a group consisting of: at least one email account associated with the at least one user, phone number of at least one client device associated with the at least one user, and a unique network identifier of at least one client device associated with the at least one user.

7. The method of claim 1, further comprising encrypting the increased security credentials stored in a secure credentials repository.

8. The method of claim 1, wherein the at least one account is a shared account accessible to a plurality of users.

9. The method of claim 1, wherein resetting the access credentials to the at least one account is done periodically according to a predefined time interval.

10. The method of claim 1, wherein resetting the access credentials to the at least one account is done on command in response to a reset command.

11. The method of claim 1, wherein the at least one automated access agent is invoked automatically in response to a login action of the at least one user for accessing the at least one account.

12. The method of claim 1, wherein the at least one automated access agent is configured to automatically log the at least one user into a plurality of accounts of a plurality of online services after initiating a plurality of credentials reset sequences in which the access credentials to each of the plurality of accounts is updated to include respective increased security credentials, the respective increased security credentials of the plurality of accounts are stored in a secure credentials repository.

13. The method of claim 12, wherein the at least one user logs into each of the plurality of accounts by activating the at least one automated access agent using a single set of access credentials.

14. The method of claim 1, wherein the at least one automated access agent is executed by at least one client device used by the at least one user to log into the at least one account, the at least one automated access agent is implemented by at least one of: a web browser configured to embed automated access functionality, and at least one dedicated application.

15. The method of claim 1, wherein the at least one automated access agent is executed by at least one remote server in communication, via at least one network, with at least one client device used by the at least one user to log into the at least one account.

16. The method of claim 15, wherein the at least one online service comprises a Software as a Software (SaaS) service.

17. A method of increasing security of access to online accounts, comprising:
  using at least one processor for:
    resetting access credentials of at least one account of at least one online service of at least one user, by:
      transmitting an access credentials reset request,
      intercepting at least one credentials reset message transmitted via at least one correspondence channel associated with the at least one user, the at least one credentials reset message comprises a credentials reset network address, and
      accessing the credentials reset network address to replace existing access credentials for the at least one account with increased security credentials;
    applying at least one privacy filter to prevent exposure of private data contained in the messages;
  wherein at least one automated access agent configured to automatically login the at least one user into the at least one online service uses the increased security credentials to login to the at least one account;
  wherein the at least one credentials reset message is detected by analyzing messages received by the user via his associated at least one correspondence channel.

18. A system for increasing security of access to online accounts, comprising:
  at least one processor configured to execute a code, the code comprising:
    code instructions to reset access credentials of at least one account of at least one online service of at least one user, by:
      transmitting an access credentials reset request,
      intercepting at least one credentials reset message transmitted via at least one correspondence channel associated with the at least one user, the credentials reset message comprises a credentials reset network address, and
      accessing the credentials reset network address to replace existing access credentials for the at least one account with increased security credentials;
      revoking permission of the at least one user to access the at least one account by resetting the access credentials to replace the existing access credentials with updated credentials and discarding the updated credentials;
  wherein at least one automated access agent configured to automatically login the at least one user into the at least one online service uses the increased security credentials to login to the at least one account.

* * * * *